3,277,133
PHOSPHORUS-, SULFUR-, AND METAL-CONTAINING COMPOSITION
Peter A. Asseff, Cleveland, Ohio, assignor to The Lubrizol Corporation, Wickliffe, Ohio, a corporation of Ohio
No Drawing. Filed Apr. 29, 1965, Ser. No. 452,019
6 Claims. (Cl. 260—429.9)

This application is a continuation-in-part of co-pending application Ser. No. 484,594, filed January 27, 1955, now U.S. 3,182,021.

This invention relates to novel phosphorus-, sulfur- and metal-containing compositions. It relates more particularly to the use in lubricants of compositions which enable these lubricants to bear up under conditions of extreme pressure.

It is an object of this invention to provide novel phosphorus-, sulfur-, and metal-containing compositions.

It is also an object of the invention to provide a novel class of additives for use in lubricants.

It is another object of the invention to provide novel lubricating compositions which are of particular value as gear lubricants.

It is still further an object of the invention to reduce wear of relatively moving surfaces.

Other objects will be apparent from the following description of the invention.

The above objects are achieved by providing a composition prepared by the process comprising reacting a phosphorothioic acid in which all of the organic radicals are hydrocarbon radicals, with an approximately equimolar amount of an epoxide and to form an intermediate product and further reacting said intermediate product with a basic inorganic metal compound.

The phosphorothioic acids may be defined more fully by reference to the following structural formula:

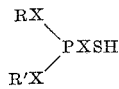

wherein R and R′ are the same or different non-functional hydrocarbon radicals and X is selected from the class consisting of oxygen and sulfur.

The phosphorothioic acids which are useful in the above described reaction may contain from one to four sulfur atoms. They are di-esters of phosphorothioic acid in which each of the organic radicals is attached to the phosphorus atom by either an oxygen or a sulfur atom.

The hydrocarbon radicals, R and R′ may be aliphatic or aromatic non-functional hydrocarbon radicals and may contain organic or inorganic substituents. The term "non-functional" is used to indicate that the radicals do not take part in or have any significant influence upon the reaction of the process. Illustrative types of organic radicals include alkyl, cycloalkyl, aryl, aralkyl, alkaryl, alkenyl, cycloalkenyl, etc., and the substituted derivatives of these, e.g., nitro-, halo-, alkoxy-, hydroxy-, carboxy-, etc. Generally these organic radicals are hydrocarbon radicals having up to about 30 aliphatic carbon atoms. Particularly useful products for use in lubricants are those derived from dialkyl phosphorothioic acids.

An especially preferable class of phosphorothioic acids are the phosphorodithioic acids. The phosphorodithioic acids may be prepared by the well-known reaction of phosphorus pentasulfide with the hydroxy compound which corresponds to the organic hydrocarbon radical. This reaction is illustrated by the action of phosphorus pentasulfide on ethyl alcohol to produce O,O-diethyl-phosphorodithioic acid. In similar fashion, aliphatic hydroxy compounds such as propyl, butyl, isobutyl, amyl, hexyl, cyclohexyl, n-octyl, iso-octyl, lauryl, etc., alcohols or aromatic hydrocarbons such as phenol, alkylated phenols, naphthols, alkylated naphthols, and the like may be reacted with phosphorus pentasulfide to form phosphorodithioic acids of utility as starting materials for the present invention.

The term epoxide as used herein is intended to denote both the epoxides and thioepoxides. They may be represented by the structural formula:

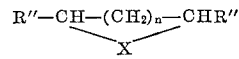

where R″ is hydrogen or a hydrocarbon radical as defined previously in connection with R and R′, X is oxygen or sulfur and $n$ is 1 or 0. Those epoxides and thioepoxides are preferred in which one of the carbon atoms attached to oxygen or sulfur is also attached to two hydrogen atoms. In other words, the preferred epoxides and thioepoxides are terminal epoxides. These have been given the name terminal epoxides because they may be thought of as being derived in most instances from a vinyl compound which has a terminal olefinic double bond.

Specific examples of suitable epoxides include the lower aliphatic epoxides in which both R″ groups may be hydrogen or lower alkyl radicals having up to about sixteen carbon atoms, e.g., ethylene oxide, 1,2-propylene oxide, 1,3-propylene oxide, 1,2-butene oxide, 1,3-butene oxide, 2,3-butene oxide, 1,2-pentene oxide, 1,2-hexene oxide, 1,2-octene oxide, 1,2-butadiene monoxide, cyclohexene oxide, etc.; epoxidized fatty oils, e.g., methyl epoxyoleate, ethyl epoxystearate, butyl 9,10-epoxystearate, etc.; epoxidized fatty acids such as epoxy oleic acid, epoxy stearic acid, etc.; and aromatic substituted epoxides such as styrene oxide.

The reaction of the phosphorothioic acid with an organic epoxide is exothermic. Although it is not necessary, it is preferred to control the temperature of the reaction mixture so that it is reasonably constant throughout the course of the reaction. The temperature of the reaction may be as low as —60° C. or lower and on the other hand it may be as high as 100° C. or even higher. Generally, for reasons of economy it is preferred to carry out the process at room temperature.

The reaction appears to involve equimolar proportions of the phosphorothioic acid and the epoxide. The identity of the product has not been established and so it is best described in terms of its method of preparation. The products are neutral, have a phosphorus: sulfur ratio of essentially 1:2, and as indicated before appear to result from the reaction of one mole each of phosphorothioic acid and epoxide.

It usually is convenient to use an amount of organic epoxide in excess of that required in order to insure a maximum yield. In most instances, the epoxide is sufficiently volatile that its removal from the reaction mixture, after the reaction is completed, is a simple operation. In some cases, it is sufficient merely to allow the excess epoxide to evaporate from the product at room temperature. The excess epoxide may also be removed by flushing the reaction product with an inert gas such as nitrogen or by heating the product mixture under vacuum.

A particularly desirable product may be obtained by bubbling an inert gas through the reaction mixture. Such a product has a much improved odor over a product prepared without such a step.

The process of preparing an intermediate by reacting a phosphorothioic acid with an epoxide is illustrated in further detail by the following specific examples:

*Example A*

To 1,780 grams (5 moles) of O,O-di(2-ethylhexyl) phosphorodithioic acid, stirred at room temperature, there are added portionwise 319 grams (5.5 moles) of propylene oxide. The ensuing reaction is quite exothermic and the temperature is maintained at 90–91° C. for three hours, whereupon an additional 29 grams (0.5 mole) of propylene oxide is added. This mixture is maintained at 90° C. for another hour and is then concentrated by heating to a final temperature of 90° C./28 mm. The dark yellow liquid residue shows the following analysis: phosphorus, 7.4%; sulfur, 15.4%.

*Example B*

To 4,940 grams (15 moles) of O,O-di-(2-methylpentyl-4) phosphorodithioic acid there are added dropwise over a period of two hours with stirring at room temperature, 1,740 grams (30 moles) of propylene oxide. The temperature is maintained at 35–40° C. throughout the addition and for an additional two hours. Then the mixture is heated at reflux temperature (85–95° C.) and concentrated by heating to a final temperature of 105° C./21 mm. The residue is filtered to give a brown filtrate having the following analysis: sulfur, 17.6%; phosphorus, 8.9%.

*Example C*

To 628 grams (2 moles) of O,O-di-(2-methylpentyl-4) phosphorodithioic acid there are aded portionwise with stirring over a period of one hour, 184 grams (2 moles) of epichlorohydrin. The temperature is maintained with external cooling at 65–70° C. throughout this period and the mixture is stirred for an additional hour, during which time the temperature abates to 30° C. The product is a green, non-viscous liquid having the following analysis: sulfur, 16.1%; phosphorus, 7.8%; and chlorine, 8.6%.

*Example D*

A sample of O,O-di-(isopropyl) phosphorodithioic acid weighing 514 grams (2 moles) is treated dropwise at room temperature with a small portion of propylene oxide. The temperature rises rapidly to 96° C., whereupon the addition of propylene oxide is halted. When the temperature has fallen to 30° C., the addition of propylene oxide is resumed until a total of 224 grams (3.9 moles) has been added, the temperature being maintained below 60° C. The resulting mixture then is heated for three hours at 60–65° C. and then concentrated by heating to a final temperature of 115° C./20 mm. The liquid residue shows the following analysis: sulfur, 23.8%; phosphorus 11.4%.

*Example E*

To 193 grams (0.5 mole) of O,O-di-(2-ethylhexyl) phosphorodithioic acid there are added portionwise at room temperature 78 grams (0.65 mole) of styrene oxide. The exothermic reaction causes the temperature to rise to 75° C. which temperature is maintained for an additional 3.5 hours. The resulting product mixture is washed with dilute aqueous sodium carbonate and then with water. This material is dried with magnesium sulfate, then filtered and the filtrate is concentrated by heating to a final temperature of 100° C./6 mm. The yellow, fluid residue shows the following analysis: sulfur, 12.8%; phosphorus, 6.3%.

*Example F*

Four hundred eighteen grams (7.2 moles) of propylene oxide is added dropwise over a period of one hour to 1,854 grams (6 moles) of O,O-di-(n-hexyl) phosphorodithioic acid. The temperature is maintained at 53–70° C. by means of external cooling throughout the addition and for an additional hour. The resulting mixture is concentrated by heating to a final temperature of 67° C./110 mm. and the fluid residue is shown to have the following analysis: sulfur, 17.7%; phosphorus, 8.3%.

*Example G*

A sample of O,O-di-(2-methylpentyl-4) phosphorodithioic acid weighing 335 grams (1.0 mole) is cooled to −30° C. by means of a Dry Ice-acetone bath. To this cooled acid there are added portionwise over a period of one hour 63.8 grams (1.1 mole) of propylene oxide. The propylene oxide is added at such a rate as to maintain the temperature between −30° C. and −35° C. When the addition is complete, the resulting mixture is allowed to warm to room temperature and any unreacted propylene oxide is removed by evaporation at reduced pressure. The residual product shows the following analysis: sulfur, 17.3%; phosphorus, 8.2%.

The reaction of the phosphorothioic acid-epoxide intermediate with the basic inorganic metal compound generally requires heating. It may be carried out from about room temperature to below the decomposition temperature. Preferably the reaction temperature is between about 50° C. and about 150° C.

The reaction appears to involve approximately equivalent portions of phosphorothioic acid-epoxide intermediate and basic inorganic metal compound. The intermediate appears to have one hydroxyl group per mole and is considered to have one equivalent weight per mole. The equivalent weight of the inorganic base is its molecular weight divided by the number of metal atoms and by the valency of the metal. Thus the equivalent weight of the zinc oxide is its molecular weight (81.38) divided by two or 40.69, the equivalent weight of lead oxide is its molecular weight (223.2) divided by two or 111.6.

It is usually convenient to use an excess amount of the basic inorganic metal compound in order to assure complete reaction. Removal of the excess basic inorganic metal compound from the reaction mixture, after the reaction is completed, is a simple operation. In most cases, it is sufficient merely to filter the liquid reaction product from the excess inorganic base.

The basic inorganic metal compounds suitable for the purposes of this invention are principally compounds of the metals of Groups I and II of the periodic table, particularly compounds of sodium, potassium, copper, calcium, strontium, barium, zinc, cadmium, and mercury, but may also include metals of Groups III or IV, such as aluminum or lead. The basic metal compounds include, for example, the metal oxides, e.g., barium oxide, calcium oxide, zinc oxide, cadmium oxide, mercuric oxide, copper oxide, lead oxide, etc.; the metal hydroxides, e.g., sodium hydroxide, potassium hydroxide, calcium hydroxide, barium hydroxide, etc.; the metal carbonates, e.g., sodium carbonate, calcium carbonate, zinc carbonate, etc.; and the metal bicarbonates, e.g., sodium bicarbonate, potassium bicarbonate, etc. Especially preferred are the basic compounds of calcium, barium and zinc.

The reaction of the phosphorothioic acid-epoxide intermediate with the basic metal compound may be carried out alone or in the presence of an inert solvent as a diluent. Frequently the presence of a solvent is advantageous, for example, a solvent which forms an azeotrope with water may be used as a diluent and and as a means of removing the byproduct water formed. Suitable solvents include petroleum naphtha, benzene, toluene, chloroform, carbon tetrachloride, etc.

The following examples more fully illustrate the preparation of the phosphorus-, sulfur-, and metal-containing compositions of this invention:

*Example 1*

A benzene solution of 2207 grams (5.2 equivalents) of a product prepared as in Example C is treated portionwise at 80° C. with 224 grams (6.0 equivalents) of zinc oxide. The resulting mixture is heated at reflux temperature and water is collected in a distillation trap until the theoretical amount of water has been removed. The mixture is filtered and the filtrate is freed of benzene by heating under vacuum. The amber liquid residue shows the following analysis: phosphorus, 7.7%; sulfur, 16.2%; and zinc, 8.5%.

*Example 2*

A solution of 250 grams (0.9 equivalent) of a product prepared as in Example D and 500 grams of benzene is treated with 44 grams (0.55 equivalent) of cupric oxide. This mixture is heated at reflux temperature for 44 hours during which time the theoretical amount of water is collected in a distillation trap. The product mixture is filtered and the filtrate is concentrated by heating to a final temperature of 100° C. at 20 mm. The residue is a light brown liquid having the following analysis: phosphorus, 9.4%; sulfur, 21.5%; and copper, 6.4%.

*Example 3*

A mixture of 50 grams (0.18 equivalent) of a product prepared as in Example D, 19.5 grams (0.18 equivalent) of mercuric oxide and 150 milliliters of benzene is prepared and heated at reflux temperature for 30 minutes, during which time the theoretical quantity of water is separated. The product mixture is freed of benzene by distillation to yield a dark liquid residue which shows the following analysis: phosphorus, 8.3%; sulfur 17.2%; and mercury 26.8%.

*Example 4*

A solution of 150 grams (0.38 equivalent) of a product similar to that prepared in Example G and 500 grams of toluene is treated with 94 grams (0.42 equivalent) of lead oxide. The mixture is heated at the reflux temperature of 111° C. for 3 hours during which time the theoretical amount of water is collected in a distillation trap. The product mixture is filtered and the filtrate is concentrated by heating to a final temperature of 100° C. at 20 mm. The residue is a dark green liquid with the following analysis: phosphorus, 6.12%; lead, 24.5%; and sulfur, 11.4%.

*Example 5*

A toluene solution of 150 grams (0.38 equivalent) of a product similar to that prepared in Example D is treated at reflux temperature (111° C.) with 15 grams (0.38 equivalent) of cupric oxide. The reaction mixture is heated at reflux temperature and water is collected in a distillation trap until the theoretical amount of water has been removed. The mixture is filtered and the filtrate is freed of toluene by distillation to a temperature of 100° C. at 20 mm. The dark brown liquid residue shows the following analysis: phosphorus, 7.52%; sulfur, 16.2%; and copper, 5.52%.

*Example 6*

An intermediate product is prepared by the dropwise addition of 382 grams (6.6 equivalents) of propylene oxide to 1284 grams (6.0 equivalents) of diisopropylphosphorodithioic acid which has previously been flushed for one-half with a stream of carbon dioxide at 2 cubic feet per hour. The addition reaction requires 4 hours at a temperature of 30°–40° C. while cooling with a water bath. The intermediate product is then stripped to 40° C. at 20 mm. with no apparent distillation to obtain a theoretical yield of a colorless liquid.

A solution of 1088 grams (4.0 equivalents) of the above intermediate in 500 mm. of benzene is treated portionwise at 40° C. with 194 grams (4.4 equivalents) of zinc oxide. The resulting mixture is heated at reflux temperature after the addition of 2 grams of glacial acidic acid until the theoretical amount of water has been removed. The mixture is filtered and the filtrate is freed of benzene by heating to a final temperature of 80° C. at at 30 mm. The residue is a colorless liquid which shows the following analysis: phosphorus, 9.84%; sulfur, 20.64%; and zinc, 12.42%.

*Example 7*

A mixture of 1548 grams (4.0 equivalents) of a material similar to that obtained in Example G, 176 grams (4.0 equivalents) of zinc oxide and 1000 grams of benzene is prepared and heated to reflux. One gram of glacial acetic acid is added and the resulting mixture is heated at reflux (82° to 90° C.) until the theoretical amount of water has been removed over a 3.5 hour period. The product mixture is filtered and concentrated by heating to a final temperature of 80° C. at 30 mm. The residue is a red liquid with the following analysis: phosphorus, 7.62%; sulfur, 16.5%; and zinc, 7.6%.

*Example 8*

A solution of 412 grams (1 equivalent) of the product of Example A in 500 grams of benzene is treated portionwise at 80° C. with 44 grams (1.1 equivalents) of zinc oxide. The resulting mixture is heated at its reflux temperature and water is collected in a distillation trap until the theoretical amount has been removed. The mixture is filtered and the filtrate freed of benzene by heating to a final temperature of 100° C. at 20 mm.

The phosphorus-, sulfur-, and metal-containing compositions of this invention are useful as additives for lubricating oils to improve the load-carrying properties of the oil and to inhibit lubricatng oils aganst corroson. Generally the compositions of this invention can be used for a variety of purposes such as for example, in crankcase oils, torque-convertor oils, gear oils, turbine oils, turbo-jet oils, cutting oils, rolling mill lubricants, rock drilling lubricants, greases, etc.; as well as for non-lubricating purposes, e.g., transformer oils, hydraulic oils, plastics, flotation agents, hydrocarbon fuels such as gasoline, fuel oil, furnace oil, etc.

The lubricating oils in which the product of the process of this invention are useful as additives may be of mineral, animal, vegetable, or synthetic origin. Ordinarily mineral lubricating oils are preferred because of their availability, general excellence, and low cost. For certain applications oils belonging to one of the other types may be preferred. For instance, synthetic polyester oils such as dioctyl adipate and di-2-ethyl-hexyl sebacate are often preferred as jet engine lubricants. Normally the preferred lubricating oils are fluid oils ranging in viscosity from about 400 SUS (Saybolt Universal seconds) at 100° F. to about 500 SUS at 210° F.

Lubricants containing the compositions of this invention may also contain other conventional lubricant additives such as metal detergents (e.g., barium dodecylbenzene sulfonate, calcium mahogany sulfonate); ashless dispersants (e.g., dehydrated reaction products of an alkylene polyamine with a long chain alkenyl succinic anhydride); inhibitors (e.g., zinc dioctyl phosphordithioate, dioctyl phosphite, phenyl beta-naphthyl amine, 2,6-ditertiary-butyl-4-methyl phenol); as well as other load-carrying additives (e.g., chlorinated wax, dicyclohexyl disulfide); viscosity index improving agents; etc.

The concentration at which the composition of this invention is to be used as a lubricant additive depends primarily upon the type of oil used and the nature of the service to which the lubricant is to be subjected. In most instances, the concentration will range from about 0.01% to about 10% by weight of the additive in a lubricant. More often the concentration will range from about 0.05% to about 5% by weight of the composition.

Other modes of applying the principals of the invention may be employed, change being made as regards the details described, provided the features stated in any of the following claims, or the equivalent of such, be employed.

What is claimed is:

1. A composition prepared by the process comprising reacting a phosphorothioic acid diester in which all of the organic radicals are hydrocarbon radicals, with an approximately equimolar amount of an epoxide having the structural formula:

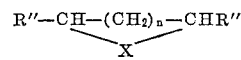

wherein R'' is hydrogen or a hydrocarbon radical, X is oxygen or sulfur and $n$ is 1 or 0 to form an intermediate product, and further reacting said intermediate product with a basic inorganic metal compound selected from the class consisting of oxides, hydroxides, carbonates, and bicarbonates of Group I and II metals, aluminum and lead.

2. The composition of claim 1 wherein the phosphorothioic acid diester is a phosphorodithioic acid diester.

3. The composition of claim 1 wherein the epoxide is a lower aliphatic epoxide.

4. The composition of claim 1 wherein the basic inorganic metal compound is a zinc compound.

5. The composition prepared by the process comprising reacting O,O-di-(2-methylpentyl-4)phosphorodithioic acid with an approximately equimolar amount of propylene oxide to form an intermediate product, and further reacting said intermediate product with zinc oxide.

6. The composition prepared by the process comprising reacting O,O-di-(2-ethylhexyl)phosphorodithioic acid with an approximately equimolar amount of propylene oxide to form an intermediate product, and further reacting said intermediate product with zinc oxide.

References Cited by the Examiner
UNITED STATES PATENTS

| | | | |
|---|---|---|---|
| 2,905,683 | 9/1959 | Goldsmith | 260—429.7 |
| 2,983,742 | 5/1961 | Boba et al. | 260—429.9 |
| 3,004,996 | 10/1961 | Arakelian | 260—435 XR |
| 3,018,247 | 1/1962 | Anderson et al. | |
| 3,081,261 | 3/1963 | Stuart et al. | |
| 3,168,497 | 2/1965 | Twitchett | 260—429.9 XR |

T. E. LEVOW, *Primary Examiner.*

DANIEL E. WYMAN, TOBIAS E. LOVOW,
*Examiners.*

P. P. GARVIN, H. M. S. SNEED, *Assistant Examiners.*